United States Patent Office 2,764,470
Patented Sept. 25, 1956

2,764,470

PURIFICATION OF URANIUM PEROXIDE

Clarence L. Richardson, Salem, Sanford B. Smith, Woodstown, and Gordon B. Robbins, Pennsgrove, N. J., assignors to the United States of America as represented by the United States Atomic Energy Commission No Drawing. Application March 7, 1946,
Serial No. 652,828

6 Claims. (Cl. 23—14.5)

This invention relates to the purification of uranium peroxide.

In the manufacture of uranium perioxide from materials containing substantial quantities of fluorides and alkaline earth metals, products are sometimes obtained containing substantial quantities of fluorine. For some uses of the products these impurities are highly objectionable. Thus upon treatment with acids they may form hydrofluoric acid solutions of a corrosive character where it is least desired.

An object of the invention is the purification of uranium peroxide. A further object is the removal of alkaline earth metal fluoride impurities from such a product. A still further object is the accomplishment of these purposes without substantial loss of the uranium content of the material being treated. Further objects will appear from the following description of the invention and illustrative examples of its application.

In accordance with the present invention a uranium peroxide to be purified is subjected to a treatment with an aqueous acid solution having its concentration and quantity limited to dissolve only a minor proportion of the uranium peroxide.

The concentration of acid effective for accomplishing the purposes of the invention is variable within a substantial range, for example, a pH range of 0.1 to 2.0 can be used. The preferred concentration will depend upon the maximum permissible impurity of the peroxide being treated. For treatment of uranium peroxide containing 2% to 4% of fluorine, present as magnesium fluoride, the purity of the product can be greatly improved by employing three to six parts by weight of aqueous nitric acid solution having a pH between about 0.7 and about 2.0 for each part by weight of uranium peroxide. The more concentrated acid solutions within this range effect a higher degree of purification and a greater dissolution of the uranium peroxide. The preferred pH is between 0.7 and 1.0. With a slurry in nitric acid having a pH of about 0.9 approximately 10% of the uranium is dissolved in the solution and the fluorine content of the undissolved uranium peroxide is reduced to about 0.3% F. With lower concentrations of acid the impurity of the final product is somewhat greater but less of the uranium is dissolved.

It should be particularly noted that uranium dissolved in the nitric acid solution is not lost to the process. By partially neutralizing the solution by means of sodium carbonate, sodium hydroxide, ammonium hydroxide slaked lime, quick lime, or another suitable alkali to a pH between 2.5 and 3.9 substantially all of the residual uranium is precipitated as the peroxide containing a proportion of fluorine not much greater than contained in the uranium peroxide initially being purified. Uranium peroxide precipitated in this way therefore is susceptible of purification by acid washing in the same manner as the original crude and may be held for treatment in the first step of the process along with a succeeding batch of crude uranium peroxide or separately treated in the same manner.

In order that complete recovery of uranium may be obtained, it is desirable to add hydrogen peroxide to the solution so as to maintain a definite excess of this material during the precipitation step. The added hydrogen peroxide not only reoxidizes any uranium peroxide reduced before or during the process but the excess seems to exert a mass action effect causing precipitation of a greater proportion of the uranium peroxide than obtainable at the same pH in the absence of the excess. The hydrogen peroxide may be added during only the first or second step but preferably is added during both steps.

The washing process may be carried out at ordinary temperatures, for example about 10° C. to about 70° C.

The following specific examples further illustrate the process of the invention. Quantities are in terms of weight unless otherwise indicated.

Example 1

One hundred and forty-five parts of solid uranium peroxide containing 2.8% F present as magnesium fluoride or compounds thereof is slurried with 955 parts of water. Concentrated nitric acid (60% $HNO_3$), together with about 12 parts of aqueous 30% $H_2O_2$ solution, is added to the slurry until a pH of 0.76 is attained. The slurry is agitated for 20 hours at 20° C. and then filtered. The residue is washed with water and dried. The 130 parts of dry residue obtained contains 92% of the initial uranium and only 0.30% fluorine.

The uranium in the filtrate and wash liquor may be recovered as follows: The combined liquors are treated with sufficient slaked lime to bring the pH of the liquor to 3.0 to 3.2; this precipitates substantially all of the uranium as the peroxide. The precipitate is then separated from solution promptly by filtration. Eleven parts of uranium peroxide product containing about 4% of fluorine is obtained.

When the same process is carried out using sulfuric acid instead of nitric acid a purified product of equal quality is obtained but in this case the recovery of purified uranium peroxide is only about 65% so that about 35% remains in the filtrate to be precipitated and reworked.

Example 2

Two hundred sixty parts of wet uranium peroxide (containing 150 parts of $UO_4.2H_2O$ and 4.4 parts of inorganic fluoride) is charged with 10 parts of aqueous 30% $H_2O_2$ solution and 360 parts of water to a 25–12–S–Cb chromium nickel steel tank provided with an effective agitator. Sufficient aqueous 60% $HNO_3$ solution is added (about 90 parts) to provide a final solution pH of 0.9. The slurry is agitated at ambient temperature (35–30° C.) for about 12 hours. The addition of the nitric acid causes a temperature rise of about 5° C. The slurry is then passed to a filter press to separate solid uranium peroxide from the acid soluiton. The separate solid is washed in the filter press with about 120 parts of cold water, which is collected with the filtrate. The solid, after drying on a tray drier, comprises 135 parts of $UO_4.2H_2O$ containing 0.4 parts of fluorine.

The mixture of filtrate and wash liquor is heated to 40° C. Eighty parts of 30% $H_2O_2$ solution is added and the mixture is partially neutralized with aqueous 30% NaOH solution to a pH of 1.8–2.0. About 75 parts of the 30% NaOH solution is needed. The resulting slurry is immediately filtered. The wet filtercake, comprising about 55% solids, contains 15 parts of uranium peroxide and 0.6 parts of fluorine. It is stored for acid washing with the next batch of uranium peroxide. The combined wash liquor, which contains about 3.4 parts of fluorine in solution, is discarded, or completely neutralized and evaporated or otherwise treated to recover its sodium nitrate content.

It will be understood that we intend to include variations and modifications of the invention and that the preceding examples are illustrations only and in no wise to be construed as limitations upon the invention, the scope of which is defined in the appended claims, wherein we claim:

1. The method of preparing uranium peroxide of low fluoride content, which comprises forming a slurry of fluoride-contaminated uranium peroxide in an aqueous solution of an acid selected from the group consisting of nitric acid and sulphuric acid sufficient to dissolve only a minor proportion of the uranium peroxide and then separating the undissolved uranium peroxide from the solution.

2. The method of preparing uranium peroxide of low fluoride content from fluoride-contaminated uranium peroxide, which comprises forming a slurry of the fluoride-contaminated uranium peroxide in an aqueous solution of an acid selected from the group consisting of nitric acid and sulfuric acid having a pH between about 0.1 and about 2.0 in sufficient quantity to dissolve only a minor proportion of the uranium peroxide, agitating the slurry with the solution for a sufficient period to secure thorough contact of solid with solution, and separating the undissolved uranium peroxide from the aqueous acid solution.

3. The method of purifying uranium peroxide contaminated with fluorides, which comprises thoroughly washing the fluoride-contaminated uranium peroxide with aqueous nitric acid solution having a pH between about 0.1 and about 2.0 and separating undissolved uranium peroxide from the aqueous nitric acid solution.

4. The method of preparing uranium peroxide of low fluoride content from fluoride-contaminated uranium peroxide, which comprises washing the fluoride-contaminated uranium peroxide with aqueous nitric acid solution having a pH between 0.1 and 2.0 in quantity sufficient to dissolve only a minor proportion of the uranium peroxide, separating the undissolved uranium peroxide from aqueous nitric acid solution, neutralizing the separated solution to a pH between 2.5 and 3.9 so as to precipitate dissolved uranium peroxide, and separating the resulting peroxide from the aqueous solution.

5. The method of purifying uranium peroxide contaminated with fluorides, which comprises thoroughly washing the fluoride-contaminated uranium peroxide with aqueous nitric acid solution having a pH between about 0.1 and about 2.0 and containing excess hydrogen peroxide, and separating undissolved uranium peroxide from the aqueous nitric acid solution containing hydrogen peroxide.

6. The method of preparing uranium peroxide of low fluoride content from fluoride-contaminated uranium peroxide, which comprises forming a slurry of the fluoride-contaminated uranium peroxide in between three and six times its weight of aqueous nitric acid solution containing hydrogen peroxide and having a pH between 0.7 and 1.0, agitating the slurry at a temperature between about 10° C. and about 70° C. to effect thorough contact of the uranium peroxide and solution, separating the undissolved uranium peroxide from aqueous nitric acid solution, neutralizing the separated solution to a pH between 2.5 and 3.9 so as to precipitate dissolved uranium peroxide in the presence of hydrogen peroxide, and separating the resulting peroxide from the aqueous solution.

No references cited.